United States Patent
Tani et al.

[11] Patent Number: 5,850,047
[45] Date of Patent: Dec. 15, 1998

[54] PRODUCTION OF COPPER POWDER

[75] Inventors: Hiroji Tani, Nagaokakyo; Naoaki Ogata, Moriyama, both of Japan

[73] Assignee: Murata Manufacturing Co., Ltd., Kyoto, Japan

[21] Appl. No.: 814,329

[22] Filed: Mar. 11, 1997

[30] Foreign Application Priority Data

Mar. 11, 1996 [JP] Japan .................................. 8-052977

[51] Int. Cl.$^6$ ............................................ B22F 09/24
[52] U.S. Cl. .......................... 75/246; 75/245; 75/228; 75/331; 75/255; 75/247; 75/342; 148/513; 148/514
[58] Field of Search .......................... 75/246, 245, 228, 75/331, 255, 247, 342; 148/513, 514; 428/546; 423/592, 604

[56] References Cited

U.S. PATENT DOCUMENTS 4,645,532  2/1987  Mackiw et al. ........................ 75/0.5 A

*Primary Examiner*—Patrick Ryan
*Assistant Examiner*—M. Alexander Elve
*Attorney, Agent, or Firm*—Ostrolenk, Faber, Gerb & Soffen, LLP

[57] ABSTRACT

A method of producing copper powder having little variation in its particle size and an excellent monodispersion properties. A copper complex ion solution is prepared from a copper-containing solution and a complexing agent, then a reducing agent is added to the copper complex ion solution to precipitate metallic copper. The copper-containing solution herein contains copper sulfate, copper formate, copper pyrophosphate, copper chloride or copper carbonate and the complexing agent is at least one carboxylate or phosphate.

4 Claims, No Drawings

PRODUCTION OF COPPER POWDER

BACKGROUND OF THE INVENTION

1. Field of the Invention

The present invention relates to a method of producing copper powder, and more particularly to a technique for producing copper powder having excellent monodispersion properties.

2. Description of the Related Art

In the past, conductive copper pastes and the like have been used for producing ceramic electronic parts. Copper powder which is required for producing such conductive copper pastes and the like has been generally produced following the procedures given below.

The first method is a process as shown in Japanese Examined Patent Publication No. 5-57324, wherein an aqueous solution containing copper ion is allowed to react with an alkali to precipitate copper hydroxide slurry, then hydrazine or a hydrazine compound is added thereto as a reducing agent to prepare copper oxide slurry, and then a supernatant liquid is removed from the copper oxide slurry. Finally, fresh water, followed by hydrazine or a hydrazine compound, are added thereto so that metallic copper is precipitated.

A second method to obtain copper powder is disclosed in Japanese Unexamined Patent Publication No. 3-287707, in which a copper containing solution which contains copper carbonate is mixed with hydrazine or a hydrazine compound as a reducing agent, then the resulting mixture is heated at 40°–150° C. to precipitate metallic copper.

Now, copper powder to be contained in a conductive copper paste has been required to be fine, to have little variation in its particle size, little aggregation, and excellent monodispersion properties, in order to control the characteristics of the copper thick film prepared by baking the conductive copper paste.

Excellent monodispersion means both excellence in dispersibility and small deviation in the diameters of the particles. In other words, monodispersion is excellent if the particles have approximately the same diameters and little coagulation.

However, copper powder obtained according to the above-mentioned first production method is most likely to have large variations in particle size and insufficient homogeneity. The copper powder produced according to the second production method tends to show a lot of aggregation, and poor monodispersion properties. The comparative example (disclosed below) results in the copper powder having a large deviation in diameter (0.5–5 $\mu$m) and much coagulation, and thus has poor monodispersion.

SUMMARY OF THE INVENTION

The present invention is able to correct the above-mentioned inconveniences. An advantage of the invention that it is able to provide a method of producing copper powder having little variation in its particle size, and excellent monodispersion properties.

According to a first aspect of the present invention, there is provided a method of producing copper powder in which a solution of a copper complex ion is prepared from a copper-containing solution and a complexing agent, and then a reducing agent is added to the copper complex ion solution to precipitate metallic copper. According to a second aspect of the present invention, the copper-containing solution contains copper sulfate, copper formate, copper pyrophosphate, copper chloride or copper carbonate, and the complexing agent is at least one complexing agent selected from the group consisting of carboxylates and phosphates. The reducing agent used therefor is either hydrazine or a hydrazine compound.

Other features and advantages of the present invention will become apparent from the following description of embodiments of the invention.

DESCRIPTION OF EMBODIMENTS OF THE INVENTION

Examples of the invention will now be described. In these examples of a method of producing copper powder according to the invention, a solution of a copper complex ion is prepared from a copper-containing solution and a complexing agent, then a reducing agent is added to the copper complex ion solution to precipitate metallic copper; the copper-containing solution contains copper sulfate, copper formate, copper pyrophosphate, copper chloride or copper carbonate; and the complexing agent can be at least one or a mixture of carboxylates or phosphates. The reducing agent used therefor is either hydrazine or a hydrazine compound.

EXAMPLE 1

Copper sulfate pentahydrate, pure water, sodium pyrophosphate which is a phosphate which can work as the complexing agent, and hydrazine hydrate which works as the reducing agent, were prepared. 395 g of copper sulfate pentahydrate and 2.5 liters of pure water were mixed to prepare a copper-containing solution. 1406 g of sodium pyrophosphate was added to and mixed with the copper-containing solution to prepare a copper complex ion solution, i.e. a copper pyrophosphate complex ion solution, and 200 g of hydrazine hydrate was added to and mixed with the solution at a temperature of 30° C. The solution was heated to 80° C. and maintained at that temperature for 2 hours to carry out the reaction sufficiently, to reduce most of the copper ions in the solution to metallic copper. Then the metallic copper powder was recovered from the solution and washed.

Then, the copper powder obtained according to the above-mentioned procedure was examined and it was confirmed to have an SEM particle size of 0.2 to 0.3 microns, little variation in its particle size, and excellent monodispersion properties with little aggregation. It is thought that these results are obtained since the pyrophosphate ion adsorbed on the surface of the generated copper particle works to increase the repulsion force among the copper particles, allowing uniform grain growth and preventing the aggregation of the copper powder particles.

In this example, sodium pyrophosphate was selected as the phosphate to work as a complexing agent, but the phosphate is not limited to sodium pyrophosphate. The inventors have confirmed that sodium tripolyphosphate, sodium tetrapolyphosphate, sodium metaphosphate and sodium hexametaphosphate can be used as well.

EXAMPLE 2

Instead of using sodium pyrophosphate as the complexing agent, sodium citrate, one of the carboxylates, was prepared. 395 g of copper sulfate pentahydrate was mixed with 2.5 liters of pure water to prepare a copper-containing solution, then 463 g of sodium citrate was added to and mixed with the copper-containing solution to provide a copper complex ion solution, i.e. copper citrate complex ion solution. Here, sodium hydroxide was added to prepare a copper citrate complex ion solution having a pH of 13.

Then, 200 g of hydrazine hydrate was added to and mixed with the solution at 30° C. then the solution was heated to 80° C. and maintained at that temperature for 2 hours to carry out the reaction, and the resulting metallic copper obtained as copper powder was recovered from the solution and washed. The copper powder was then examined and confirmed to have an SEM particle size of 0.2–0.4 microns and excellent monodispersion properties.

EXAMPLE 3

Sodium tartarate, one of the carboxylates, was prepared for use as the complexing agent. 395 g of copper sulfate pentahydrate was mixed with 2.5 liters of pure water to prepare a copper- containing solution, then 362 g of sodium tartarate was added to and mixed with the copper containing solution to provide a copper complex ion solution, i.e. copper tartarate complex ion solution. Here, sodium hydroxide was also added to prepare a copper tartarate complex ion solution having a pH of 10. Then, 200 g of hydrazine hydrate was added to and mixed with the solution at 30° C. then the solution was heated to 80° C. and maintained at that temperature for 2 hours to carry out the reaction sufficiently.

The resulting metallic copper obtained as copper powder was recovered from the solution and washed, then examined and confirmed to have an SEM particle size of 0.5–0.7 microns, little variation in its particle size and excellent monodispersion properties with little aggregation.

COMPARATIVE EXAMPLE 395 g of copper sulfate pentahydrate was mixed with 2.5 liters of pure water to prepare a copper containing solution and 200 g of hydrazine hydrate was added to and mixed with the solution at 30° C. Then the solution was heated to 80° C. and maintained at that temperature for 2 hours to carry out the reaction and the metallic copper obtained as copper powder was examined. The SEM particle size of the obtained copper powder was beyond the range of 0.5 to 5 microns, and showed large variations in its particle size, a lot of aggregation, and thus, insufficient monodispersion properties.

CONCLUSION

As described above, according to the disclosed methods of producing copper powder, fine copper powder having little variation in its particle size, little aggregation and excellent monodispersion properties can be obtained. Accordingly, the characteristics of the copper thick film prepared by baking the conductive copper paste and the like can be easily controlled.

Although, in the above described Examples 1 to 3 the copper-containing solution contained copper sulfate, the inventors have confirmed that a solution containing copper formate, copper pyrophosphate, copper chloride or copper carbonate can be used as well.

Although the present invention has been described in relation to particular embodiments thereof, many other variations and modifications and other uses will become apparent to those skilled in the art. Therefore, the present invention is not limited by the specific disclosure herein.

What is claimed is:

1. A method of producing copper powder comprising the steps of:

preparing a copper complex ion solution from a copper-containing solution and at least one complexing agent selected from the group consisting of carboxylates and phosphates;

then adding a reducing agent to the copper complex ion solution to precipitate metallic copper.

2. A method of producing copper powder according to claim 1, wherein the copper-containing solution contains at least one compound selected from the group consisting of copper sulfate, copper formate, copper pyrophosphate, copper chloride and copper carbonate.

3. A method of producing copper powder according to claim 2, wherein the reducing agent is selected from the group consisting of hydrazine and hydrazine compounds.

4. A method of producing copper powder according to claim 1, wherein the reducing agent is selected from the group consisting of hydrazine and hydrazine compounds.

* * * * *